United States Patent

[11] 3,570,624

[72] Inventor Ward F. O'Connor
 Denville, N.J.
[21] Appl. No. 560,713
[22] Filed June 27, 1966
[45] Patented Mar. 16, 1971
[73] Assignee The Lummus Company
 New York, N.Y.

[54] WEB TRACKING AND CONTROL
 8 Claims, 3 Drawing Figs.
[52] U.S. Cl.................................................. 181/0.5,
 73/67.5, 226/45
[51] Int. Cl.................................................. B65h 25/02
[50] Field of Search........................................ 981/.5 (B);
 226/4 (S); 340/8 (MM); 73/67.7; 226/3, 15—23

[56] References Cited
UNITED STATES PATENTS
3,090,534 5/1963 Frommer et al.............. 226/21
3,108,727 10/1963 Farber.......................... 226/20
2,430,013 11/1947 Hansell......................... 340/8MM
2,567,407 9/1951 Slaymaker.................... 340/8MM
3,108,032 10/1963 Carlson........................ 226/45X
3,225,988 12/1965 Drenning..................... 226/45X
3,342,284 9/1967 Baird............................ 181/.5(B)

Primary Examiner—Rodney D. Bennett, Jr.
Assistant Examiner—Daniel C. Kaufman
Attorney—Marn and Jangarathis ABSTRACT: The invention relates to a method of and apparatus for automatically measuring the sideway displacement of a continuous web. In accordance with the invention, one or more sound wave paths which are variably attenuated by sideway displacement of one or more edges of a continuous and moving web are used to automatically measure the amount and direction of such sideway displacement of the web. In one of the embodiments, two sound wave paths are each translated into separate electrical voltages having a magnitude corresponding to the magnitude of the sound wave and a polarity identifying the particular sound path. The difference in the magnitudes of the voltages and the polarity thereof are measured to indicate the amount and direction respectively, of the sideway displacement of the web.

PATENTED MAR 16 1971 3,570,624
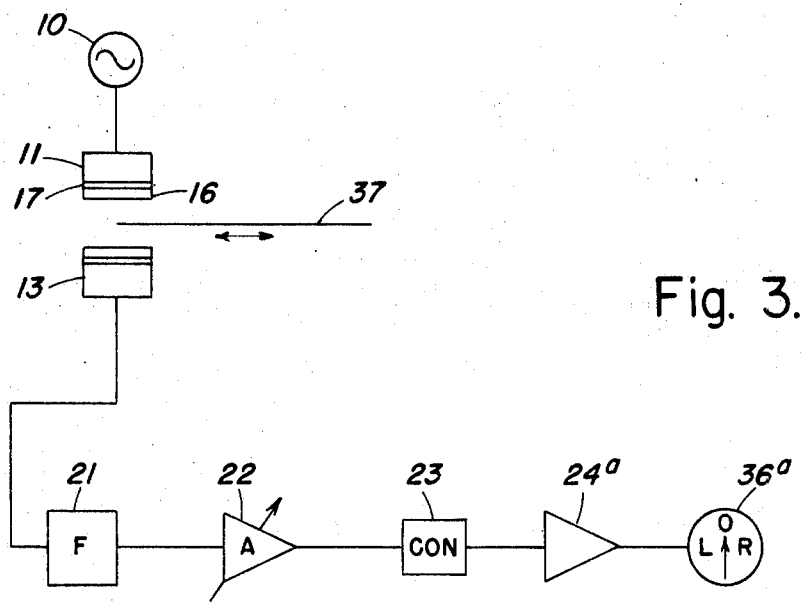
Fig. 3.
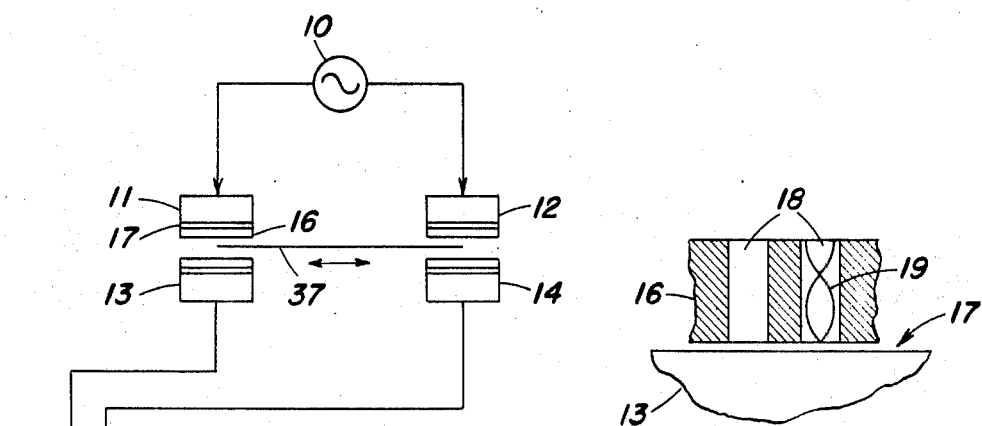
Fig. 1. Fig. 2.
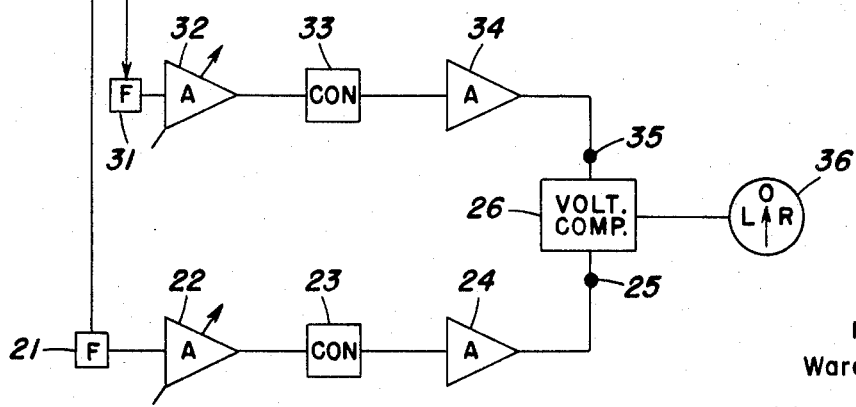
INVENTOR
Ward F. O'Connor
BY *Marn & Jangaruthis*
ATTORNEYS

WEB TRACKING AND CONTROL

This invention relates to a method of and apparatus for automatically measuring the sideway displacement of a continuous web of material and, more specifically, to such apparatus including one or more trains of sound waves having a preselected frequency and attenuated to a lesser or greater degree, depending upon the amount of the sideway displacement of the web.

Numerous types of apparatus for automatically tracking the sideway displacement of a continuous web of paper, plastic, metal or the like are well known in the art. One of these comprises a photoelectric system. This apparatus is necessary in order to maintain optimum sheet quality at a maximum speed of the web moving in a lengthwise direction in a given surface treating process, as well as to provide a neat winding of the web into a roll, at the end of a step in the process or at the final product or for feeding other operations or slitting, laminating, printing, packaging, etc. For this purpose, one or both edges or the centerline of the web may be automatically tracked for providing automatic adjustment of the sideway displacements of the moving web as necessary. The photoelectric tracking system has the disadvantages of requiring a degree of darkness as in the case of the manufacture of photographic film or transparent film and suffering impairment of efficiency as in the case of a dusty atmosphere.

The present invention therefore contemplates the use of apparatus having one or more sound wave paths in which the sound waves are variably attenuated by sideway displacement of one or more edges of a continuous and moving web of material for automatically measuring the amount and direction of such sideway displacements as the web is moved lengthwise through a process for surface treatment or is being wound into a roll or is slit or further processed by laminating, printing or packaging, etc.

A specific embodiment of the present invention comprises a first pair of transducers spaced in a lateral direction for transmitting two discrete trains of sound waves into two proximate sound paths, a second pair of spaced transducers, each associated with one of the transmitting transducers for receiving the sound wave train in one of the sound paths, two paths of electrical equipments, each electrical path connected to the receiving transducer in one of the sound paths for translating the sound pulse train therein into an electrical voltage having a magnitude corresponding to the magnitude of the latter sound wave train in the one sound path and a polarity identifying the latter one path, a voltage magnitude comparator for providing an output voltage having a magnitude proportional to the difference between the magnitudes of the voltages effective in the two electrical paths, each path providing a voltage of particular polarity for identifying the voltage of the larger magnitude, and a meter connected to the output of the voltage comparator for indicating the magnitude and polarity of such voltage difference, or for indicating the amount and direction of the sideway displacements of the web.

In the operation of the foregoing specific embodiment of the invention, the opposite edges of a web of material are so initially disposed in preselected relative positions in the two sound wave environments intervening between the associated transmitting and receiving transducers as to attenuate equal amounts of the sound wave trains in the respective two discrete sound wave environments. This centers the web to produce a 0-center reading, for example, on the meter. As the opposite edges of the web are moved lengthwise through the two sound wave environments, sideway displacements of the web attenuate more or less of the sound pulse trains in the respective sound environments, thereby effecting corresponding variations in the magnitudes and polarities of the voltages in the respective electrical paths. These voltage magnitude and polarity variations activate the voltage comparator which is thereby caused to produce an output voltage having a magnitude proportional to the difference in magnitude between the two voltages in the respective electrical paths and a polarity identifying the path having the larger voltage magnitude. As a matter of initial choice, the combined left-hand sound and electrical paths shown in the figure hereinafter discussed may be preselected to indicate web displacement to the left and the combined right-hand sound and electrical paths to indicate web displacement to the right. As a consequence, the meter may be appropriately calibrated to indicate such left and right web displacements. Also, the output voltage of the voltage comparator may be utilized to activate a recorder for providing a permanent record or data for a computer or a servosystem for automatically adjusting the positions of the web relative to its initially assumed centerline position as the web is moving.

In a modification of the present invention, one combined sound and electrical path may be employed to measure the sideway displacement of only one edge of the web as the latter one web edge is moved lengthwise through the one sound environment associated with the one combined sound and electrical paths. The voltage resulting from this displacement of the one web edge may also be utilized to activate a meter, a recorder, a computer or a servosystem. Servosystems and controls may operate machinery to follow the web or the web to follow the machinery or operate machine and the web.

One feature of the invention resides in its availability for use in situations in which illumination is detrimental to a particular process for treating the surface of the web. Another feature is that it may be expeditiously used in either illuminated or darkened atmospheres. Another feature is that it may be expeditiously used for transparent materials. A further feature is that dusty or similar atmospheres do not impair its effectiveness. Still another feature is the employment of an acoustical transformer for stabilizing acoustical signaling transmission in an air medium. An additional feature is the availability of the invention in situations involving a use of a liquid sound wave environment instead of air.

The invention is readily understood from the following description taken together with the accompanying drawing in which:

FIG. 1 is a block diagram of a specific embodiment of the invention for automatically measuring the sideway displacements of the opposite edges of a continuous and moving web of material;

FIG. 2 is a fragmentary cross-sectional view of one type of an acoustical impedance transformer usable in FIGS. 1 and 3; and FIG. 3 is a block diagram of a modification of the invention in FIG. 1 for automatically measuring the sideway displacement of one edge of a continuous and moving web of material.

It is understood that the same reference numerals are employed to identify corresponding elements appearing in the several figures of the drawings.

FIG. 1 discloses a source 10 of a train of electrical voltage pulses having a predetermined frequency connected to laterally spaced transducers 11 and 12 whose surfaces are provided with predetermined equal areas for transmitting two discrete trains of sound wave pulses having the frequency of the voltage pulses into two ambient environments of a common type proximate thereto. Transducers 13 and 14 disposed oppositely to the transmitting transducers 11 and 12, respectively, in the common environments are provided with surfaces coextensive with the corresponding transmitting transducer surfaces for receiving the two discrete sound pulse trains from the respective ambient environments. The two receiving transducers translate the two discrete sound pulse trains into corresponding discrete trains of electric voltage pulses having the frequency of the voltage pulse train supplied by the voltage source.

The voltage source may comprise an electrical oscillator of a type well-known in the art; and it may also if so desired produce a continuous voltage wave of the preselected frequency instead of the voltage pulse train above mentioned. The electrical voltage pulse train or continuous voltage wave may have, for example, a frequency of 30 kilocycles or higher in the sonic or ultrasonic range. The transmitting transducers may comprise piezoelectric, magnetorestrictive or electromagnetic acoustic drivers. While the receiving transducers may include piezoelectric, magnetostrictive or electromagnetic acoustical receivers, or a capacity microphone of a variable impedance type having the proper frequency characteristic.

An acoustical impedance matching transformer 16 shown in FIG. 2 and having opposite surfaces coextensive with the surfaces of the transmitting and receiving transducers is suitably affixed to each of the respective latter transducers. The plate, of this acoustical impedance matching transformer, has a thickness equivalent to an odd number of one-quarter wavelengths 19 of the frequency of the voltage pulse train supplied by the voltage pulse train supplied by the voltage source in air and includes a plurality of spaced holes 18 bored through its thickness. Each impedance transformer has one surface so spaced at point 17 from its associated transducer surface as to provide an air gap of approximately 0.010-inch thickness. Acoustical impedance transformers serve at least the following two purposes. A first purpose is to provide an impedance match between the acoustically vibrating surfaces of the respective transmitting and receiving transducers and ambient environment of air through which the two discrete sound pulse trains travel. The transformer increases the amount of power transference between the respective transducer surfaces and the ambient environment or air and at the same time minimizes a dependence of such power transference on a precise determination of the spacing between the associated opposing transmitting and receiving transducer surfaces in a given instance. A second purpose served by acoustical impedance transformers is to reduce the amplitude of the standing waves between the unprotected parallel surfaces of the transmitting and receiving transducers and simultaneously therewith to reduce the "breathing" effected by the latter surfaces.

These standing waves represent a high Q storage of energy in the ambient environments intervening between the opposing parallel surfaces of the respective transmitting and receiving transducers and are dependent upon the velocity of sound in air and the loss of energy to the ambient environment proximate to but on not included in the air directly intervening between the opposing transducer surfaces as just mentioned. These standing waves also represent an impedance matching condition that is highly sensitive to the phase of the sound waves striking various areas of the receiving transducer surfaces. Since the velocity of sound in air varies with the changeable characteristics of pressure, temperature and different components such as, for example, moisture, these characteristics may effect variations in the amplitude of the sound waves derived from the ambient environment by the receiving transducer surfaces. Obviously, such amplitude variations may be multiplied by the number of standing waves between the opposing transmitting and receiving transducer surfaces. While standing waves may also be present in the holes in the several acoustical impedance transformer plates, such waves represent, for example, a three-fourths wavelength 19 and the effect thereof is not multiplied. An additional reduction of the standing waves intervening between the opposing transmitting and receiving transducer surfaces may be achieved by grooving the remaining parallel exterior surfaces of each acoustical transformer plate with an acute angle groove to disperse the acoustical waves on the latter surface rather than to deflect them back to the opposing transmitting transducer surface.

FIG. 1 also delineates a first electrical path 20 including in sequence an output of receiving transducer 13, filter 21, alternating voltage amplifier 22, converter 23 of alternating voltage to direct current voltage, direct voltage amplifier 24 and a first input terminal 25 of a voltage magnitude comparator 26; it also shows a second electrical path 30 including in sequence an output of receiving transducer 14, filter 31, alternating voltage amplifier 32, converter 33 of alternating current voltage to direct current voltage, direct voltage amplifier 34, and a second input terminal 35 of the voltage magnitude comparator. This comparator has its output connected to a meter 36 which for the purpose of this description may also include a recorder for making a permanent record or a servosystem serving a purpose mentioned hereinafter. As the outputs of the two receiving transducers provide electrical voltage pulse trains having the same frequency as previously pointed out and differing possibly only in magnitude and polarity for reasons hereinafter explained, the corresponding electrical components constituting the respective electrical paths comprise structures having identical characteristics and well-known to the art as indicated hereinafter.

Filters 21 and 31 are tuned to the predetermined frequency of the voltage pulse train supplied by source 10 and of the corresponding voltage pulse train effective in the outputs of the respective receiving transducers. Alternating voltage amplifiers 22 and 32 have a matched stable gain which is linear over the operating range, and includes a manually adjustable gain control for a purpose that is subsequently mentioned. Converters 23 and 33 utilized utilize a rectifying feedback loop across an alternating voltage amplifying stage to produce linear rectification with a low threshold. Direct voltage amplifiers 24 and 34 provide the outputs of the respective converters with desired magnitudes. Voltage magnitude comparator 26 consists of a network of components which smooths the amplified outputs of the respective direct voltage amplifiers for producing an output voltage proportional to the difference between the magnitudes of the two electrical voltages effective in the respective electric paths 20 and 30, each of the latter paths having a voltage provided with a particular polarity for identifying the one path of the latter two paths having the larger voltage magnitude as further explained hereinafter. Meter 36 provides an instant-to-instant indication of the effective center line or sideways displacements, for example, of a web 37 of material in a manner that is subsequently described. It is understood that the arrow shown in FIG. 1 indicates that the web may be subjected to lateral displacements in opposite directions.

Returning to the voltage magnitude comparator and meter connected thereto for a moment, it is assumed as an example for the purpose of this explanation that the two inputs of direct voltage to the magnitude comparator vary in the range from $-10$ volts to $+10$ volts balanced to ground in order to provide an output voltage range of 0—10 volts balanced to ground in order to provide an output voltage range of 0—10 volts balanced to ground. Thus, the voltage magnitude comparator r translates the $\pm$ volt variation into a corresponding 0—10 volt variation biased to a magnitude of 5 volts. As a consequence, the meter may be caused to read effectively $+5$ volts to indicate equal voltages in the respective electrical paths 20 and 30, to read zero volts for a maximum negative voltage in one path say, for example, path 20, or to read 10 volts for a maximum positive voltage in the other path say, for example, path 30. For the purpose of a simplification of the meter readings in response to certain operational conditions explained hereinafter, the meter may be assumed to be calibrated with a 0-center, a left-hand R and a right-hand L. Thus, when the varying negative voltages in path 20 are larger than the varying positive voltages in path 30, the meter readings vary from O to R; when the varying positive voltages in path 30 are larger than the negative voltages in path 20, the meter readings vary from O to L; and, when the voltages in paths 20 and 30 are equal, the meter reading is a 0-center.

In the operation of an automatic measuring system in accordance with FIG. 1, it is initially assumed that the web is not yet disposed in the system and the voltage source is effective to provide a voltage pulse train of the predetermined frequency for activating the two transmitting transducers. These impart two discrete sound pulse trains of corresponding frequency into the ambient environments in the direction of the two receiving transducers. The two sound pulse trains are picked up by the receiving transducers and translated thereby into two corresponding voltage pulse trains, each having the frequency of the initial voltage pulse train. The two translated voltage pulse trains are then processed via the equipments in respective electrical paths 20 and 30 as hereinbelow explained to produce a reading on the meter. Since the voltages in electrical paths 20 and 30 are assumed to be equal, the meter provides a 0-center reading to represent the +5 volts as mentioned above. If the meter indicates an off 0-center reading, a manual adjustment of the gain of either amplifier 22 or 32 in an appropriate sense serves to provide a precise 0-center reading at this time.

As it is now assumed, the meter provides the 0-center reading, the web of material having a characteristic identified hereinbefore is then inserted into the system in FIG. 1 in such a manner as to dispose the opposite edges of its width or minimum dimension in preselected relative positions in the immediate environments intervening between the associated transmitting and receiving transducers, thereby providing a 0-center reading on the meter. This means that the opposite edges of the web occupy such preselected relative positions as to attenuate equal amounts of the sound pulse trains effective in the environments intervening between the respectively associated transmitting and receiving transducers. Hence, the voltage pulse trains effective in electrical paths 20 and 30 have equal magnitudes for still providing the 0-center reading on the meter. In other words, a centerline of the web occupies the desired position in the system.

Next, the web is moved at a predetermined speed in the direction of its length or maximum dimension via a plurality of suitable rollers, not shown, in a manner familiar to the art for the purpose of treating one or both surfaces of the web in accordance with a preselected process. For example, such process may involve the coating of a photographic film. As the web is so moving, it may move sideways, i.e., its opposite edges may be displaced either to the left or right with regard to their initially preselected relative positions. Thus, the opposite edges of the web may move to the left at one instant, or to the right at the next succeeding instant, or remain in the initially preselected relative positions in the next following instant in response to lengthwise movement of the web.

Assuming the web is being displaced in the direction from the right to the left in the first instant, its left-hand edge is moved from its initially preselected position deeper into the environment between the left-hand transmitting and receiving transducers 11 and 12, attenuating a correspondingly increased amount of the sound pulse train effective therebetween. This increased attenuation is reflected as a proportionately decreased magnitude of translated electric voltage pulse train in path 20; this voltage of decreased magnitude in path 20 is provided with a negative polarity. As the left-hand edge of the web is moving to the left as just mentioned, it is obvious that the right-hand edge of the same web is at the same time withdrawing from its initially preselected position in the environment between the right-hand transmitting and receiving transducers 12 and 14, respectively, thereby attenuating a correspondingly decreased amount of the sound pulse train effective therebetween. This decreased attenuation is reflected as a proportionately increased magnitude of the translated electric voltage pulse train in path 30; this voltage of increased magnitude in path 30 is provided with a positive polarity. The translated voltage having the smaller magnitude and negative polarity and the translated voltage having the larger magnitude and positive polarity effective in paths 20 and 30, respectively, are simultaneously applied to the two inputs of the voltage magnitude comparator. This comparator provides an output voltage which is proportional to the difference between the two input voltages effective in paths 20 and 30 and which has a positive polarity identifying path 30 as having the larger magnitude voltage. As the comparator supplies a 5-volt bias to its output as previously pointed out, the effective output voltage thereof at the moment lies in the range from +5 to +10 volts. This may be translated into the range from 0 to L as shown on the meter for the reason previously discussed and indicates that the web is presently moving in the direction from right to left or to the left. This compara-tor output voltage may also be used to activate a recorder or servosystem as above mentioned.

Now, assuming the web is being displaced in the direction from right to left, its left-hand edge is withdrawing from its initially preselected position in the sound environment between the transmitting and receiving transducers 11 and 13, respectively, thereby attenuating a correspondingly decreased amount of the sound pulse train effective therebetween. This decreased attenuation is reflected as a proportionately increased magnitude of translated electric voltage pulse train in path 20; this voltage of increased magnitude in path 20 is provided with a negative polarity. At the same time, the right-hand edge of the same web is moving from its initially preselected position deeper into the wound environment between the right-hand transmitting and receiving transducers 12 and 14, respectively, thereby attenuating a correspondingly increased amount of the sound pulse train effective therebetween. This increased attenuation is reflected as a proportionately decreased magnitude of translated electric voltage in path 30; this voltage of decreased magnitude in path 30 is provided with a negative polarity. As the translated voltages of different magnitudes and different polarities are simultaneously applied to the two inputs of the voltage magnitude comparator, the latter provides an output which is proportional to the difference between the two input input voltages and which has a negative polarity identifying path 20 as having the larger magnitude voltage. As the comparator supplies the 5-volt bias, the effective output thereof at the moment lies in in the range of 0 to +5 volts. This may be translated into the range 0 to R as shown on the meter to indicate that the web is presently moving in the direction from left to right or to the right. This comparator voltage may be employed to activate a recorder or servosystem as previously mentioned.

Assuming further at the moment the web is moving so that its left-hand and right-hand edges occupy their initially preselected relative positions, then both edges attenuate equal amounts of the two sound pulse trains in the sound environments between the left-hand and right-hand associated transmitting and receiving transducers. This equal attenuation is reflected as voltages of equal magnitudes and opposite polarities in the electrical voltage paths 20 and 30. These voltages are applied to the two inputs of the voltage magnitude comparator which is thereby actuated to provide in its output a different voltage having the polarity of the larger voltage, together with the 5-volt bias. As such voltage difference is 0, the 5-volt bias causes the meter to indicate a 0-center reading to indicate a condition of no measurable lateral displacement of the web in either the left or right direction, i.e., the center line of the web is occupying the desired position in the system.

Thus, the circuit of FIG. 1 may provide automatic measurements of sideway displacements of each of the two opposite edges of a continuous and moving web of material a lateral distance in each of two opposite directions, and such measurements may be achieved in the presence or absence of light, in water or other liquids through which a train of sound pulse waves may be transmitted with tolerable efficiency.

FIG. 3 is a modification of FIG. 1 and includes essentially the components of one path in FIG. 1 except the voltage magnitude comparator in the latter figure is omitted; it includes a direct voltage amplifier 24a and a meter 36a which serve the purposes of the direct voltage amplifier 24 and comparator 26 and meter 36, respectively, in FIG. 1 in a sense that is hereinafter explained. As the system of FIG. 3 measures automatically the lateral displacement of only one edge of the web, it is obvious that the system requires only one combined sound and electrical path in the respect hereinafter discussed. As the equivalent components of both FIGS. 1 and 3 are identified with the same reference numerals and were hereinbefore explained from structural and functional standpoints, an additional explanation of the equivalent components is unnecessary at this time. However, it is understood that direct voltage amplifier 24a may provide an output voltage varying in range of 0—10 volts balanced to ground and supplied with a 5-volt bias for the following purposes, viz., a +5 volts to represent the left-hand web is occupying its initially preselected position, 0-volts to represent the left-hand web edge is moving to the left of the initially preselected position, and a +10 volts for representing the left-hand web edge is moving to the right of the initially preselected position. For the purpose of this explanation, meter 36a may be calibrated to show the +5 volts as a 0-center, the 0 volts as a left-hand L and the +10 volts as a right-hand R to facilitate an easy understanding of the following operation.

The operation of FIG. 3 takes place in the following manner. For this purpose, it is assumed that the left-hand edge of the web is initially disposed at a preselected position in the sound wave environment intervening between the transmitting and receiving transducers. This position may be central of the sound environment, i.e., halfway between the laterally opposite sides thereof. This causes the left-hand edge of the web to attenuate one-half of the magnitude of the sound wave train travelling in the sound environment for producing such predetermined magnitude of translated voltage pulse train in the output of amplifier 24a as to produce the 0 reading on meter 36a. As the web is moved lengthwise, its left-hand edge may move deeper into the sound environment, for example, thereby attenuating a correspondingly increased amount of the sound pulse train travelling therein. This increased attenuation is reflected as a proportionate decrease in the magnitude of the translated electric voltage pulse train below the aforenoted predetermined magnitude of translated electric voltage pulse train provided in the output of amplifier 24a. This decreased voltage produces a reading between 0 and L on meter 36a, thereby indicating the left-hand web edge is moving to the left. On the other hand, as the web is moved lengthwise, its left-hand edge may withdraw from the sound wave environment thereby attenuating a correspondingly decreased amount of the sound pulse train travelling therein. This decreased attenuation is reflected as a proportionate increase in the magnitude of the translated electric voltage pulse train above the aforenoted predetermined magnitude of electric voltage pulse train in the output of amplifier 24a. This increased voltage produces a reading between O and R on meter 36a, thereby indicating the left-hand web edge is moving to the right. Obviously, when the left-hand edge web edge returns to its initially preselected position, the magnitude of the voltage in the output of amplifier 24a is substantially equal to the aforenoted predetermined magnitude thereof. This actuates meter 36a to return to its 0-center reading for the reason hereinbefore explained. The amount of the left and right sideway displacements of the left-hand web edge in FIG. 3 and the uses of the corresponding voltages resulting therefrom correspond with those given above for the operation of FIG. 1.

It is understood that the invention herein is described in specific respects for the purpose of this description. It is also understood that such respects are merely illustrative of the application of the principles of the invention. Numerous other arrangements may be devised by those skilled in the art without departing from the spirit and scope of the invention.

I claim:

1. Apparatus for at automatically measuring the amount and direction of sideway displacement of one edge of a continuous and moving web of material, comprising:
    a source of electric voltage of preselected frequency;
    a first transducer electrically connected to said source for translating said voltage into sound waves having said voltage frequency, said transducer having a surface of predetermined area for transmitting said sound waves into an ambient environment;
    a second transducer having a surface oppositely disposed to said first transducer surface and coextensive therewith for receiving said sound waves from said environment and translating said last-mentioned waves into an electric voltage having the frequency of said source voltage;
    acoustical impedance matching means on said first and second transducer surfaces;
    said acoustical matching means including a plate having a thickness of the order of an odd number of one-fourth wavelengths of said sound waves in said environment, said plate provided with a plurality of spaced holes extending through said thickness thereof, said plate having a surface substantially coextensive with the associated surface of the transducer on which said plate is mounted;
    said web having one edge along the width thereof disposed in a preselected position in said environment between said first and second transducer surfaces for attenuating said sound waves a predetermined amount and thereby attenuating the translated voltage a corresponding amount, said one edge of said web further attenuating said sound waves and translated voltage in proportion to the amount and direction of the sideway displacement of said one edge of said web with regard to said preselected position as said web is moved in a lengthwise direction; and
    means electrically connected to said second transducer for deriving from said attenuated voltage corresponding to said preselected position of said one edge of said web a voltage of predetermined magnitude and for deriving from the further attenuated voltage a voltage varying in magnitude relative to said last-mentioned predetermined voltage magnitude to provide automatic measurements of the amount and direction of said sideway displacement of said one edge of said web relative to said preselected position thereof as said web is moved in said lengthwise direction.

2. The apparatus according to claim 1 in which each of said plates is mounted a distance of approximately 0.010 inch from said associated transducer surface.

3. The apparatus according to claim 1 in which said driving means includes in sequence a filter connected to said second transducer and tuned to the frequency of said second transducer translated voltage, an amplifier for amplifying said second transducer translated voltage, a converter for lie linearly changing the translated voltage into a direct voltage, and a meter for indicating the magnitude of the converted direct voltage.

4. Apparatus for automatically measuring the amount and direction of the sideway displacement of the opposite edges of a continuous and moving web of material, comprising:
    a source of electrical voltage of predetermined frequency;
    a first pair of spaced transducers connected to said voltage source and translating said voltage into two discrete streams of sound waves having the voltage predetermined frequency, said transducers having surfaces of predetermined equal areas for transmitting said two sound wave streams into common environments;
    a second pair of transducers, each associated with one of said first transducers, said second transducers having surfaces spaced from and coextensive with said first transducer surfaces for receiving said sound wave streams from said environments and translating said last-mentioned sound wave streams into two discrete corresponding electric waves having the frequency of said source voltage,
    acoustical impedance matching means on the surfaces of said first and second pairs of transducers, said acoustical matching means including a plate having a thickness of the order of an odd number of one-fourth wavelengths of said sound waves in said streams in said environments so as to substantially maximize the power transference between associated transducers;
    said web having the opposite edges along the width thereof disposed in preselected positions in said sound wave streams for attenuating said sound waves therein a predetermined amount and thereby attenuating the associated translated voltages a corresponding amount, said web opposite edges further attenuating said sound waves in said sound streams and associated translated voltages in proportion to the amount and direction of the sideway displacement of said web edges with regard to said preselected positions thereof as said web is moved in a lengthwise direction; and means electrically connected to said second transducers for deriving from said two attenuated voltages corresponding to said preselected positions of said web opposite edges a difference voltage of predetermined magnitude and for additionally deriving from said further attenuated voltages another difference voltage varying in magnitude and polarity relative to said predetermined voltage magnitude difference of the sideway displacement of said web opposite edges with regard to said preselected positions thereof as said web is moving in said lengthwise direction.

5. The apparatus according to claim 2 in which said voltage deriving means comprises:

a pair of electrical paths, each providing a voltage of varying magnitude and preselected polarity and including in sequence;

a filter connected to each of said second transducers and tuned to the frequency of said second transducer translated voltage;

an amplifier for the last-mentioned translated voltages;

a converter for translating the amplified translated voltage into direct voltage;

a comparator for deriving a difference voltage of varying magnitude from the voltage of varying magnitude and polarity in the respective last-mentioned paths; and a meter for providing indications of said last-mentioned difference voltage of varying magnitude.

6. Apparatus for automatically measuring the amount and direction of sideway displacement of the opposite edges of a continuous and moving web of material, comprising:

means for continuously providing two discrete paths of sound waves;

means for continuously receiving said sound waves from said two discrete paths and translating said last-mentioned sound waves in said two paths into two corresponding discrete electric voltages;

said web having the opposite edges along the width thereof disposed at preselected positions in said two sound wave paths for attenuating the sound waves therein a predetermined amount and thereby attenuating the associated translated voltage a corresponding amount, said web edges further attenuating said sound waves in said two paths and said attenuated two associated voltages in proportion to the amount and direction of the sideway displacement of said web edges with regard to said preselected positions thereof as said web is moved in a lengthwise direction; and means connected to said receiving means for deriving from said attenuated two voltages corresponding to said preselected positions of said web opposite edges a difference voltage of predetermined magnitude and for additionally deriving from the further attenuates two voltages a difference voltage whose absolute magnitude indicates the amount and direction of the sideway displacement of said web opposite edges with regard to said preselected positions thereof as said web is moving in said lengthwise direction.

7. The apparatus according to claim 6 in which each of said plates is mounted a distance of approximately 0.010 inch from said associated transducer surface.

8. Apparatus for automatically measuring the amount and direction of the sideway displacement of the opposite edges of a continuous and moving web of material, comprising:

a source of electrical voltage of predetermined frequency;

a first pair of spaced transducers connected to said voltage source and translating said voltage into two discrete streams of sound waves having the voltage predetermined frequency, said transducers having surfaces of predetermined equal areas for transmitting said two sound wave streams into common environments;

a second pair of transducers, each associated with one of said first transducers, said second transducers having surfaces spaced from and coextensive with said first transducer surfaces for receiving said sound wave streams from said environment and translating said last-mentioned sound wave streams into two discrete corresponding electric waves having the frequency of said source voltage;

acoustical impedance matching means on the surface of each of said first and second transducers, said acoustical matching means, including a plate having a thickness of the order of an odd number of one-fourth wavelengths of said sound waves in said streams in said environments and provided with a plurality of spaced holes extending through said thickness thereof, said plate having a surface substantially coextensive with the associated transducer surface and spaced a predetermined distance therefrom, said last-mentioned distance comprising a gap of said environment;

said web having the opposite edges along the width thereof disposed in preselected positions in said sound wave streams for attenuating said sound waves therein a predetermined amount and thereby attenuating the associated translated voltages a corresponding amount, said web opposite edges further attenuating said sound waves in said sound streams and associated translated voltages in proportion to the amount and direction of the sideway displacement of said web edges with regard to said preselected positions thereof as said web is moved in a lengthwise direction; and means electrically connected to said second transducers for deriving from said two attenuated voltages corresponding to said preselected positions of said web opposite edges a difference voltage of predetermined magnitude and for additionally deriving from said further attenuated voltages another difference voltage varying in magnitude and polarity relative to said predetermined voltage magnitude difference of the sideway displacement of said web opposite edges with regard to said preselected positions thereof as said web is moving in said lengthwise direction.

PO-1050
(5/69)

UNITED STATES PATENT OFFICE
CERTIFICATE OF CORRECTION

Patent No. 3,570,624      Dated    March 16, 1971

Inventor(s)   WARD F. O'CONNOR

It is certified that error appears in the above-identified patent and that said Letters Patent are hereby corrected as shown below:

Col. 3, line 42, after "but" delete "on".
Col. 4, line 19, after "33" delete "utilized".
line 44, after "ground" insert --.-- and delet
last word "in".
line 45, delete complete line "order to provic
output voltage range of 0-10 volts".
line 46, delete "balanced to ground,"
line 47, before "translates" delete "r".
Col. 7, line 43, after "left-hand" delete "edge".
line 60, delete "at ".
Col. 8, line 38, delete "lie".
line 63, "one-fourth" should be --one-quarter
Col. 9, line 53, "attenuates" should be --attenuated- Signed and sealed this 21st day of September 1971.

(SEAL)
Attest:

EDWARD M. FLETCHER, JR.
Attesting Officer

ROBERT GOTTSCHALK
Acting Commissioner of Pate